US011159332B2

(12) United States Patent
Moses

(10) Patent No.: US 11,159,332 B2
(45) Date of Patent: Oct. 26, 2021

(54) LOW FRICTION DEVICE ENROLLMENT

(71) Applicant: Entrust, Inc., Dallas, TX (US)

(72) Inventor: Timothy Edward Moses, Ottawa (CA)

(73) Assignee: Entrust, Inc., Dallas, TX (US)

( * ) Notice: Subject to any disclaimer, the term of this patent is extended or adjusted under 35 U.S.C. 154(b) by 24 days.

(21) Appl. No.: 16/423,695

(22) Filed: May 28, 2019

(65) Prior Publication Data

US 2019/0280881 A1 Sep. 12, 2019

Related U.S. Application Data

(62) Division of application No. 15/204,234, filed on Jul. 7, 2016, now abandoned.

(Continued)

(51) Int. Cl.
*H04L 9/32* (2006.01)
*H04L 9/00* (2006.01)
(Continued)

(52) U.S. Cl.
CPC ............ *H04L 9/3263* (2013.01); *G06F 21/44* (2013.01); *G06K 9/00* (2013.01); *G06K 9/18* (2013.01);
(Continued)

(58) Field of Classification Search
CPC ... H04L 9/006; H04L 9/14; H04L 9/30; H04L 9/0643; H04L 9/0861; H04L 9/3263; H04L 9/3239; H04L 63/061; H04L 63/0823; H04L 63/06; H04L 63/18; H04W 12/00522; H04W 12/0023; H04W 12/35;
(Continued)

(56) References Cited

U.S. PATENT DOCUMENTS

2005/0065743 A1* 3/2005 Cumming .............. G01D 4/004
702/62
2005/0144437 A1 6/2005 Ransom et al.
(Continued)

FOREIGN PATENT DOCUMENTS

EP 2523439 A1 11/2012

OTHER PUBLICATIONS

European Patent Office; International Search Report and Written Opinion; International Application No. PCT/US2016/041451; dated Aug. 29, 2016.

(Continued)

*Primary Examiner* — Benjamin A Kaplan
(74) *Attorney, Agent, or Firm* — Faegre Drinker Biddle & Reath LLP

(57) ABSTRACT

A constrained device includes an exterior surface affixed with a public key associated with the constrained device. Alternatively, or in addition, the public key may be included in a container that stores the constrained device. The constrained device also includes memory, which stores a private key, wherein the private key corresponds to the public key that is affixed on the exterior surface of the constrained device. By displaying the public key on the constrained device, a system administrator may document the public key and related information about the device and its intended role in the network without requiring any human interface or any establishment of power or network at the installation site.

5 Claims, 5 Drawing Sheets

Related U.S. Application Data

(60) Provisional application No. 62/190,996, filed on Jul. 10, 2015.

(51) Int. Cl.

| | |
|---|---|
| ***H04L 9/08*** | (2006.01) |
| ***H04L 9/06*** | (2006.01) |
| ***H04L 9/14*** | (2006.01) |
| ***H04L 9/30*** | (2006.01) |
| ***H04L 29/06*** | (2006.01) |
| ***G06K 19/06*** | (2006.01) |
| ***G06K 19/07*** | (2006.01) |
| ***G06F 21/44*** | (2013.01) |
| ***G06K 9/00*** | (2006.01) |
| ***G06K 9/18*** | (2006.01) |
| ***H04W 12/30*** | (2021.01) |
| *H04W 12/77* | (2021.01) |

(52) U.S. Cl.

CPC . *G06K 19/06028* (2013.01); *G06K 19/06037* (2013.01); *G06K 19/0723* (2013.01); *H04L 9/006* (2013.01); *H04L 9/0643* (2013.01); *H04L 9/0861* (2013.01); *H04L 9/14* (2013.01); *H04L 9/30* (2013.01); *H04L 9/3239* (2013.01); *H04L 63/06* (2013.01); *H04L 63/061* (2013.01); *H04L 63/0823* (2013.01); *H04L 63/18* (2013.01); *H04W 12/35* (2021.01); *H04W 12/77* (2021.01)

(58) Field of Classification Search

CPC ......... H04W 12/77; G06F 21/44; G06K 9/18; G06K 9/00; G06K 19/06037; G06K 19/0723; G06K 19/06028

USPC ........................................................ 713/175

See application file for complete search history.

(56) References Cited

U.S. PATENT DOCUMENTS

| | | | | |
|---|---|---|---|---|
| 2011/0210820 | A1* | 9/2011 | Talty .................. | H04L 63/0492 340/5.8 |
| 2012/0297473 | A1* | 11/2012 | Case ...................... | H04W 4/70 726/10 |
| 2013/0312072 | A1 | 11/2013 | van Roermund et al. | |
| 2015/0095999 | A1* | 4/2015 | Toth ................... | H04L 63/0823 726/6 |
| 2015/0106894 | A1* | 4/2015 | Dubey ................... | G06F 21/45 726/6 |

OTHER PUBLICATIONS

U.S. Patent and Trademark Office; Non-Final Office Action; U.S. Appl. No. 15/204,234; dated Feb. 25, 2019.

* cited by examiner

LOW FRICTION DEVICE ENROLLMENT

RELATED APPLICATIONS

This application is a divisional application of application Ser. No. 15/204,234, filed Jul. 7, 2016, having inventor Timothy E. Moses, titled "LOW FRICTION DEVICE ENROLLMENT", which claims priority to Provisional Application Ser. No. 62/190,996, filed on Jul. 10, 2015, having inventor Timothy E. Moses, titled "LOW FRICTION DEVICE ENROLLMENT", both of which are incorporated herein by reference.

BACKGROUND OF THE DISCLOSURE

The disclosure relates to methods and apparatus that facilitate the enrollment of constrained devices in networks.

A constrained device, as used herein, is a device that is "constrained" with regards to its user interface and does not include a graphical user input interface (e.g. no input display screen or keypad) and may have limited CPU, memory, communication capacity, and power resources (e.g. the constrained devices may be battery operated). Examples of such constrained devices in a network, such as the Internet of Things (IoT), include temperature sensors, actuators, roadside infrastructure elements, thermostats, or any other suitable devices that are to be installed in a network, such as a network that employs the Internet. The network may be located in homes, corporate buildings, roadside infrastructures, manufacturing facilities, and other suitable installation sites.

When a manufacturer delivers constrained devices to an installation site, such as the large building in the example above, the constrained devices arrive in an undedicated state. A system administrator at the installation site can subsequently enroll the constrained devices and dedicate each constrained device to a particular role in the network. For instance, if the installation site requires several pipes for manufacturing a product, the system administrator may position a sensor on a particular pipe with respect to a junction of pipes and thus dedicate the particular sensor to report on the condition of the contents of the particular pipe. To coordinate the enrollment, the system administrator may create a database entry using an authorization server to link the particular sensor, identifiable by its public/private key pair to its intended role. Following successful enrollment, the authorization server may issue a token, such as a certificate, ticket, cookie, or any other suitable token, to the device, so that it can authenticate itself and other devices in the network.

In the examples above, an underlying assumption is that the installation site already has resources in place for the system administrator to coordinate the enrollment. For example, the installation site may already have power and a network established for the system administrator to create the data entries and for the authorization server to issue tokens. However, if such resources are unavailable at the time the constrained devices are delivered to the installation site, such as when the power and network have not yet been established at the installation site, there is delay and associated costs in enrolling constrained devices.

What is needed is a low friction way to enroll constrained devices in a manner that is unaffected by a lack of such resources.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, a constrained device has an identifier on the exterior surface of the device. The identifier (i.e. optically readable) may be a public key affixed to the device. The public key may be affixed to the device in a number of ways. For instance, the public key may be printed on a label that has an adhesive, which makes contact with the exterior surface of the device. The public key may be printed, engraved, embossed, or otherwise directly marked on the exterior surface of the device without using an adhesive label. The identifier may be a barcode, QR code, fingerprint, serial number, or other suitable identifier that serves as or contains a public key. Alternatively, the identifier may be embedded in the device, such as an RFID tag for example. The identifier may be affixed to the device in any other suitable affixation. The constrained device has a corresponding private key stored in memory. By displaying the public key on the constrained device, a system administrator may document the public key, such as by taking a picture of the public key, without requiring any establishment of power or network at the installation site. Even if the identifier is a barcode or QR code that contains the public key, the system administrator may use an enrollment device, such as a smart phone with an enrollment application executing thereon, to extract the public key from the barcode or QR code. If the identifier is a serial number, the initialization server may read the serial number and equate it to a public key, calculate the corresponding private key and store it in memory within the device. The initialization server, which may be a certification authority (CA), may generate a public key certificate using the identifier, and hence, the public key may correspond to the device. Examples of standard formats for key certificates include X.509, PGP, PEM, PKIX, PKCS #7, PublickeyInfo, and SHA-1 and other suitable formats known in the art. Identity-based encryption techniques are also known wherein a user's name or user's email address is used as a public key of a public/private key pair. As such, a user's identity is used as a basis for encryption. However, devices do not have a user name or email address, making human identity-based encryption techniques unsuitable for device enrollment. Because the system administrator has the necessary information needed to enroll the constrained device, when resources do become available, the constrained devices can be provided with suitable tokens and securely enroll onto the network earlier than had the public key not been recorded when resources were unavailable. Other advantages will be recognized by those of ordinary skill in the art.

Figure 1:
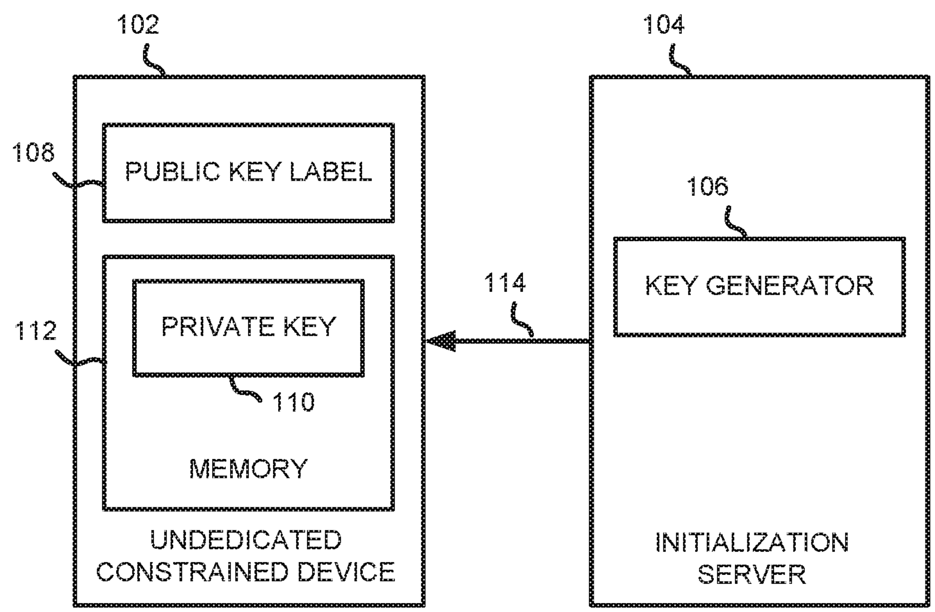
FIG. 1 is a block diagram illustrating one example of a communication diagram between an undedicated constrained device and an initialization server in accordance with one embodiment set forth in the disclosure.

FIG. 1 is a block diagram illustrating one example of a communication diagram between an undedicated constrained device 102 and an initialization server 104 in accordance with one embodiment set forth in the disclosure. For example, the initialization server 104 may be located at a plant that manufactures the undedicated constrained device 102. Other locations are contemplated. The initialization server 104 may include a key generator 106 that generates and issues a public and private key pair to the undedicated constrained device 102. The private key 110 may be transmitted via communication link 114 and stored in memory 112 of the undedicated constrained device 102. The key pair may be issued to the device during the manufacturing stage of the device, upon testing of the device, or any other suitable stage of the manufacturing cycle. The memory 112 may include random access memory (RAM), read only memory (ROM), or any suitable combination thereof as known in the art or any other suitable type of memory. Alternatively, the constrained device may have its own internal key generator rather than having its key pair issued by an external key generator.

The public key, which also may be stored in memory 112, is associated with an identifier on the exterior surface of the undedicated constrained device 102. The identifier (i.e. optically readable) may be affixed to the constrained device in a number of ways. For instance, the public key may be printed on a label that has an adhesive, which makes contact with the exterior surface of the device, a container that stores the device (e.g. packaging) prior to use of the device, or both. The public key may also be on an insert stored within the container. The public key may be printed, engraved, embossed, or otherwise directly marked on the exterior surface of the device, the container of the device, or both, without using an adhesive label. The identifier may be a barcode, QR code, fingerprint, serial number, or other suitable identifier that contains or references a public key. Alternatively, the identifier may be embedded in the device, such as an RFID tag for example. The identifier may be affixed to the device, or the container storing the device, in any other suitable affixation. For ease of illustration, the public key label 108 represents the public key associated with the identifier on the exterior surface of the undedicated constrained device 102, but is not limited to such illustration.

Figure 2:
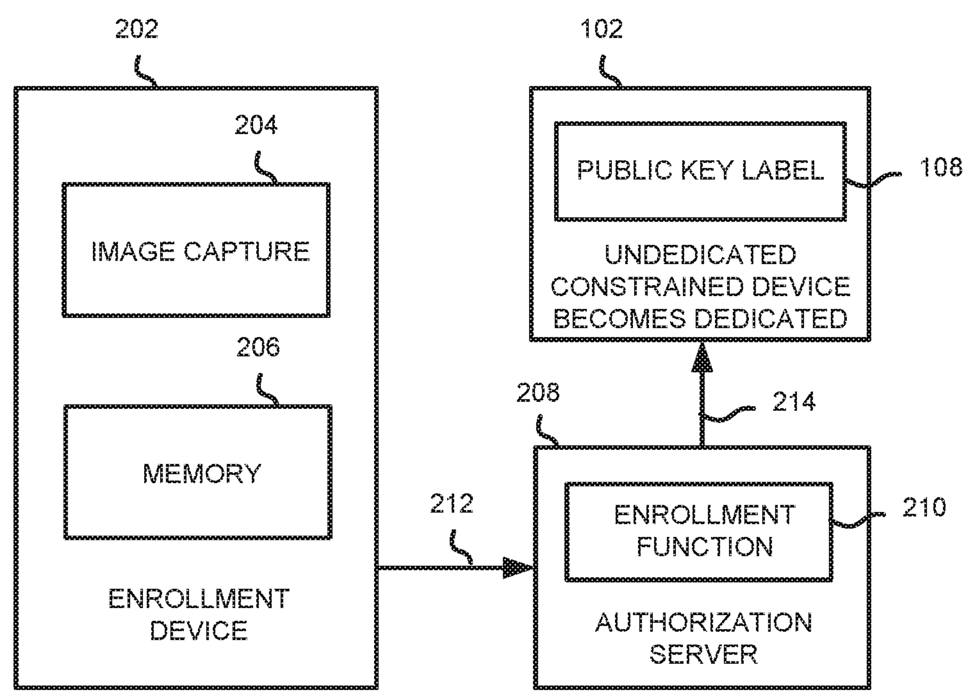
FIG. 2 is a block diagram illustrating one example of a communication diagram among an enrollment device, an authorization server, and an undedicated constrained device in accordance with one embodiment set forth in the disclosure.

FIG. 2 is a block diagram illustrating one example of a communication diagram among an enrollment device 202, an authorization server 208, and the undedicated constrained device 102 in accordance with one embodiment set forth in the disclosure. For example, the authorization server 208 may be located at an installation site, at which the undedicated constrained device 102 will be installed. Other locations are contemplated.

By displaying the public key on the undedicated constrained device 102 via the public key label 108, a system administrator may document the public key by taking a picture of the public key for instance, using the image capture capability 204 of the enrollment device 202, such as a camera or bar-code reader, without requiring any establishment of power or network at the installation site. The enrollment device 202 can send the picture of the public key, as well as any other enrollment information, such as location information of the undedicated constrained device 102, to the authorization server 208, via communication link 212. Communication link 212 represents electronic means, such as via email, as well as non-electronic means, such as via courier.

Even if the identifier is a barcode or QR code that contains the public key, the system administrator may use the enrollment device 202, such as a smart phone with an enrollment application stored in memory 206 that is executed by a processor (not shown), to extract the public key from the barcode or QR code. If the identifier is a serial number, the enrollment device 202 may read the serial number and equate it to a public key. In such cases, the enrollment application may be a barcode, QR code reader, RFID reader, or any other suitable capture application. Because the system administrator has the necessary information needed to enroll the constrained device, when resources do become available, the undedicated constrained device 102 can be provided with tokens and securely enroll onto the network earlier than had the public key not been recorded when resources were unavailable. Accordingly, the undedicated constrained device 102 becomes dedicated to the network. Other advantages will be recognized by those of ordinary skill in the art.

The authorization server 208 may be a server or any other suitable structure that includes one or more processors and associated memory such that the memory stores executable instructions that when executed by the one or more processors, cause the authorization server 208 to operate as described herein. The authorization server 208 may also be, for example, a desktop computer or any other suitable device and may be part of a security management PKI infrastructure and may serve as a certificate authority (CA) that issues public key certificates, tickets or other tokens as known in the art. In this example, the authorization server 208 may include a public key certificate generator (not shown), such as a CA, for the network, to facilitate generating and transmitting configuration certificates for the constrained device 102 via communication link 214, and an enrollment function 210. The enrollment function 210 may keep track of constrained devices that are added or removed in the network. For example, the enrollment function 210 may add the picture of the public key provided from the enrollment device 202 and pair it with location information when creating an entry for the constrained device 102 that is to be added to the network. Thus, the CA may acquire the public key and other information to certify the public key and form a certificate or other form of token to send to the constrained device 102.

The enrollment function 210 of the authorization server 208 may also need to be aware of the domain parameters that the key generator 106 of the initialization server 104 used, along with the public key, when it generated the private key. For instance, in Elliptic Curve Cryptography (ECC), all parties may need to agree on all elements defining the elliptic curve, such as constants ‘a’ and ‘b’ used in the mathematical equation defining the elliptic curve. The authorization server 208 may also consider where the constrained device 102 is physically located, what real world function it is intended to perform, its location within the network topology, and/or type of device it is, and any other suitable information, prior to issuing the configuration certificate for constrained device 102. The configuration certificates may be stored in a database (not shown) communicatively coupled to the authorization server 208.

Figure 3:
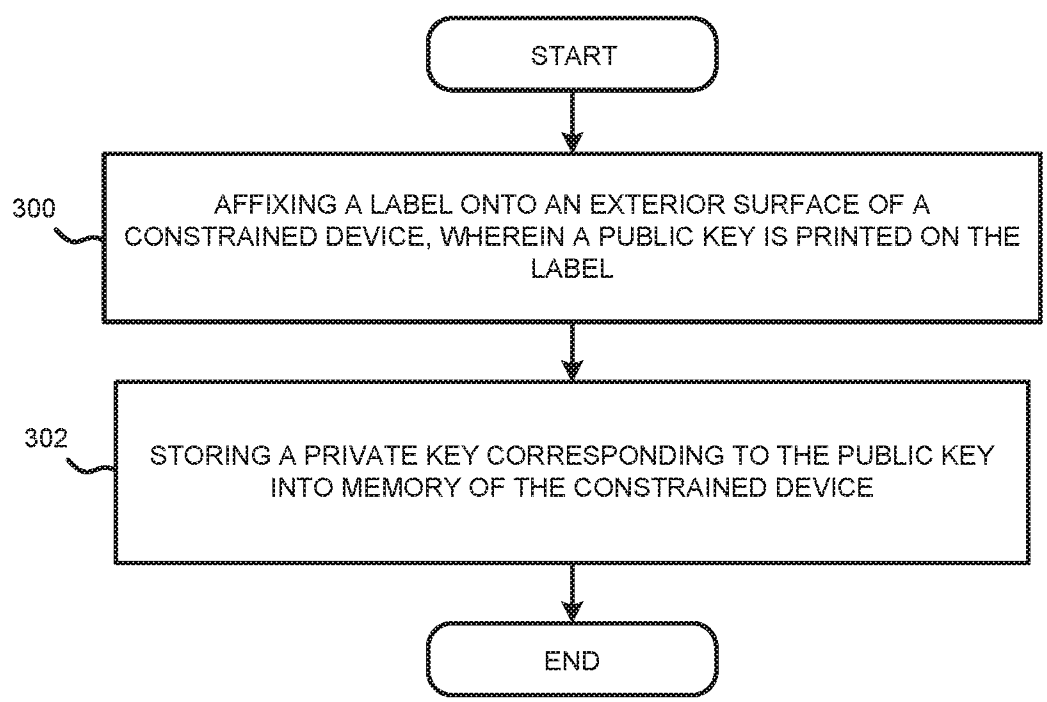
FIG. 3 is a method for low friction enrollment of a constrained device in a network.

FIG. 3 is a method for low friction enrollment of a constrained device in a network. As shown, the method may start in block 300 by for example, affixing a label 108 onto an exterior surface of the constrained device 102, wherein a public key is printed on the label 108. Alternatively, the public key may be engraved on the exterior surface of the undedicated constrained device 102. Alternatively, the identifier may be a barcode, QR code, serial number, or other suitable identifier that contains a public key. Affixing the label 108 onto the exterior surface of the constrained device 102 may include using an adhesive to apply the label, printing the label, engraving the label, or any suitable optically readable indicia. Other ways of visible identification incorporating the public key are contemplated.

Next, in block 302, the method may include storing a private key 110 corresponding to the public key into memory of the constrained device. As described above, key generator 106 may issue the public and private key pair to the constrained device 102 based on parameters known by the enrollment function 210, thereby properly authenticating the constrained device 102. Alternatively, the key generator may read the public key off the label of the constrained device, calculate the corresponding private key, based on parameters known by the enrollment function 210, and store the calculated private key in memory in the device.

Subsequently, upon shipment of the constrained device 102 to the installation site, a system administrator may document the public key, such as by taking a picture of the public key, without requiring any establishment of power or network at the installation site and without requiring any human-machine interface on the device. Even if the identifier is a barcode or QR code that contains the public key, the system administrator may use an enrollment device, such as a smart phone with an enrollment application executing thereon, to extract the public key from the barcode or QR code. If the identifier is a serial number, the enrollment device may read the serial number and equate it to a public key. Because the system administrator has the necessary information needed to enroll the constrained device, when resources do become available, the constrained devices can be provided with suitable security tokens and securely enroll onto the network earlier than had the public key not been recorded when resources were unavailable.

Figure 4:
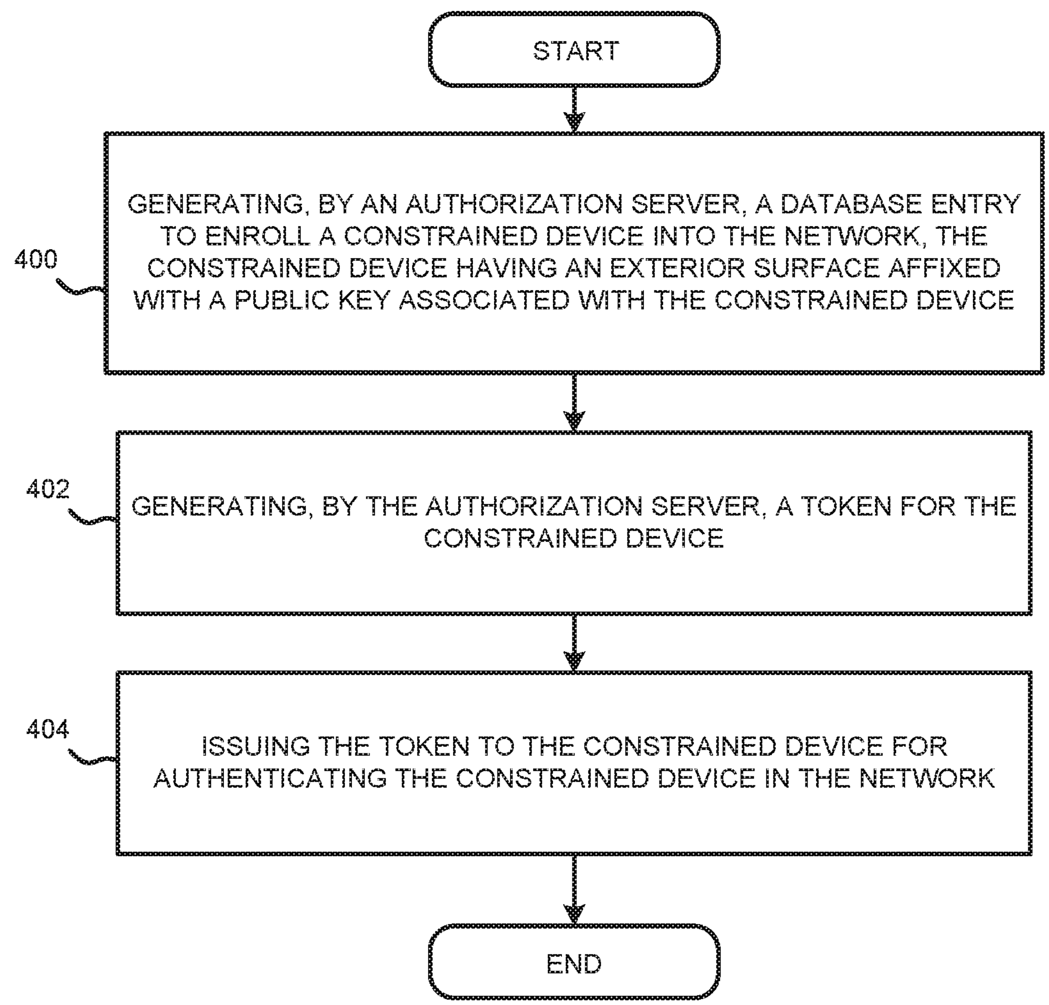
FIG. 4 is a method for low friction enrollment of a constrained device and its authentication in a network.

FIG. 4 is a method for low friction enrollment of a constrained device and its authentication in a network at, for example, an installation site. As shown, the method may start in block 400 by for example, generating, by the authorization server 208, a database entry to enroll a constrained device 102 into the network, the constrained device 102 having at least one of an exterior surface and packaging of the constrained device affixed with a public key associated with the constrained device. For example, to coordinate the enrollment of a sensor on a particular pipe with respect to a junction of pipes, the system administrator may create a database entry using an authorization server 208 to link the particular sensor, identifiable by its public/private key pair to its intended role.

Next, in block 402, the method may include generating, by the authorization server 208, a token for the constrained device 102. Subsequently, in block 404, the method may include issuing the token to the constrained device 102 for authenticating the constrained device 102 in the network. Thus, upon successful enrollment, the authorization server 208 may issue a certificate, ticket, cookie, or any other suitable token, to the constrained device 102, so that it can authenticate itself and other devices in the network.

Figure 5:
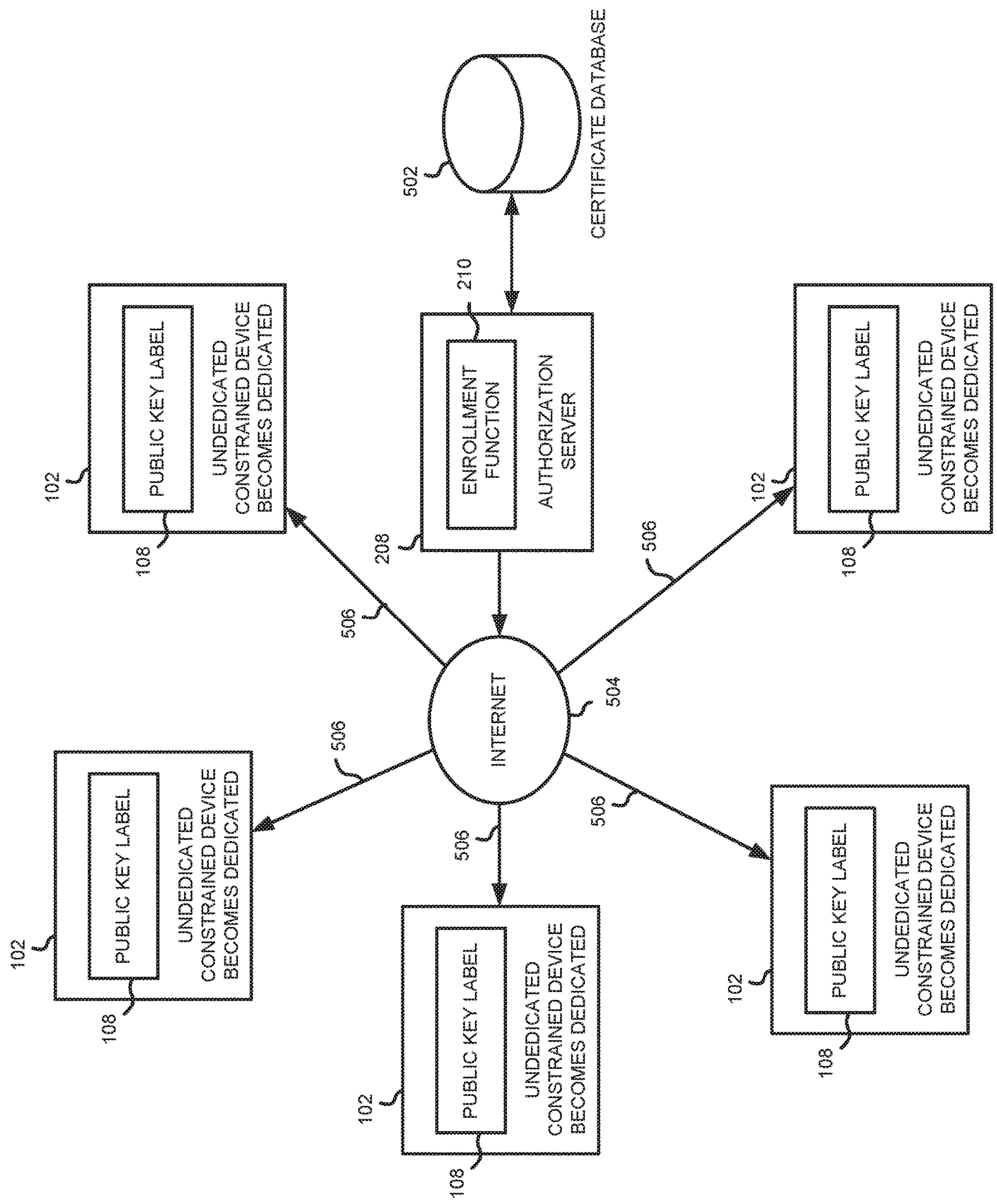
FIG. 5 is a block diagram illustrating one example of a system in accordance with one embodiment set forth in the disclosure.

FIG. 5 is a block diagram illustrating one example of a system in accordance with one embodiment set forth in the disclosure. Particularly, FIG. 5 shows several constrained devices 102 of an IoT network that are already identified by a visual public key label. An enrollment device 202 may capture the public key of each device by taking a picture of the public key label for example. The pictures may be provided to the authorization server 208 by electronic means, such as via email, as well as non-electronic means, such as via courier. Subsequently, the enrollment function 210 of the authorization server 208 may generate one or more security tokens 506 for each device. The tokens may also be stored in a database 502 communicatively coupled to the authorization server 208. When resources do become available, such as when power and the Internet 504 are set up at the installation site, the constrained devices can be provided with the tokens and securely enrolled onto the network earlier than had the public key not been recorded when resources were unavailable.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for enrolling a constrained device into a network, the method comprising:

receiving, from an enrollment device, a public key obtained from the constrained device;

generating, by an authorization server, a database entry to enroll the constrained device into the network, the constrained device having an exterior surface affixed with the public key having a corresponding private key associated with the constrained device, the database entry linking the constrained device, identifiable by the public key, to an intended role of the constrained device within the network;

generating, by the authorization server, a token for the constrained device that is based on certification of the public key and allows the constrained device to authenticate to other devices in the network; and issuing the token to the constrained device for authenticating the constrained device in the network.

2. The method of claim 1, wherein the public key associated with the constrained device is printed on a label on the exterior surface of the constrained device.

3. The method of claim 1, wherein the public key associated with the constrained device is at least one of printed, engraved, and embossed directly on the exterior surface of the constrained device.

4. The method of claim 1, wherein the public key associated with the constrained device is also embedded in the constrained device.

5. The method of claim 1, wherein the token is at least one of a certificate, a ticket, or a cookie.

* * * * *